(12) United States Patent
Nagatoshi

(10) Patent No.: US 8,072,690 B2
(45) Date of Patent: Dec. 6, 2011

(54) PROJECTION ZOOM LENS SYSTEM AND PROJECTION TYPE DISPLAY APPARATUS

(75) Inventor: Yukiko Nagatoshi, Saitama (JP)

(73) Assignee: Fujinon Corporation, Saitama-Shi, Saitama (JP)

( * ) Notice: Subject to any disclaimer, the term of this patent is extended or adjusted under 35 U.S.C. 154(b) by 225 days.

(21) Appl. No.: 12/632,451

(22) Filed: Dec. 7, 2009

(65) Prior Publication Data

US 2010/0142060 A1    Jun. 10, 2010

(30) Foreign Application Priority Data

Dec. 8, 2008 (JP) ................................ P2008-312145
Dec. 1, 2009 (JP) ................................ P2009-273066

(51) Int. Cl.
*G02B 15/14* (2006.01)
(52) U.S. Cl. .......................... 359/682; 359/770
(58) Field of Classification Search .......... 359/680–682, 359/676, 683, 649, 714, 761, 770
See application file for complete search history.

(56) References Cited

U.S. PATENT DOCUMENTS

2007/0121214 A1* 5/2007 Kuo ............................. 359/680

FOREIGN PATENT DOCUMENTS

JP    2001-91829  A    4/2001
JP    2001-100100 A    4/2001

* cited by examiner

*Primary Examiner* — Joseph P Martinez
(74) *Attorney, Agent, or Firm* — Birch, Stewart, Kolasch & Birch, LLP

(57) ABSTRACT

In order from a magnification side of the projection zoom lens system, five lens groups are arranged. The fourth lens group includes, in order from the magnification side, a negative lens having at least one aspheric surface, a positive lens, a negative lens concave toward the magnification side, a positive lens convex toward the reduction side, and a positive lens. The fifth lens group is formed of one lens, and is configured so that a ratio of a focal length of the fifth lens group to a focal length of the whole system at a wide-angle end is within a numerical range of 3 to 8.

7 Claims, 10 Drawing Sheets

EXAMPLE 1

FIG. 5　EXAMPLE 4

PROJECTION ZOOM LENS SYSTEM AND PROJECTION TYPE DISPLAY APPARATUS

The present application claims priority from Japanese Patent Application No. 2008-312145 filed on Dec. 8, 2008 and Japanese Patent Application No. 2009-273066 filed on Dec. 1, 2009, the entire content of which is incorporated herein by reference.

BACKGROUND OF INVENTION

1. Field of the Invention

The present invention relates to a projection zoom lens system having a five-group configuration and a projection type display apparatus equipped with the projection zoom lens system. Specifically, the invention relates to a projection zoom lens system and a projection type display apparatus which are suitable particularly in a case where rays containing image information, which are generated from a light valve such as a transmissive or reflective liquid crystal display device or a DMD (Digital Micromirror Device) display device, are projected from the front side and magnified on a screen.

2. Description of the Related Art

Recently, there has been remarkable development of projection type display apparatuses which display image information of a computer, a television, and the like in an enlarged manner by using light valves such as a liquid crystal display device and a DMD display device.

A zoom lens system capable of changing the size of an image is generally used as a lens system provided in such projection type display apparatuses. However, in recent years, the zoom lens system has been required to have a large change rate, that is, a large zoom ratio.

Further, the zoom lens system is also required to have a function (which is a so-called lens shift projection function) of moving an image position far away from the projection type display apparatus during projection of the image and a function of obtaining a large image by projecting the image to a position close to the projection type display apparatus. Hence, the projection zoom lens system is required to achieve an increase in the angle of view.

Furthermore, considering an increase in the precision of the recent light valves itself and the requirements and convenience of a user who uses the apparatus in a small indoor space, the projection zoom lens system is required to achieve high resolution and compactness.

In the projection zoom lens systems having a five-group configuration are disclosed in JP-A-2001-91829 and JP-A-2001-100100, a negative first lens group, a positive second lens group, a positive third lens group, a fourth lens group, and a positive fifth lens group are arranged in order from the magnification side. During zooming, the first lens group and the fifth lens group remain stationary, and the second to fourth lens groups are moved.

Since these known projection zoom lens systems are configured so that the fourth lens group includes negative, positive, negative, positive, and positive lenses arranged in order from the magnification side, fluctuation in various aberrations accompanying the zooming operation is relatively small. In addition, since the fifth lens group is formed of one lens, a relatively compact configuration is achieved.

However, the known projection zoom lens system has a zoom ratio of 1.2 to 1.3 times or so and a total angle of view of 60 degrees or so at the wide-angle end. Thus, the zoom lens system does not comply with the recent requirements.

SUMMARY OF INVENTION

The invention has been made in view of the above situation, and its object is to provide a compact projection zoom lens system, which is able to satisfactorily correct various aberrations while achieving a wide angle so that a total angle of view at the wide-angle end is 65 degrees or more and a high magnification ratio so that a zoom ratio is about 1.5 times or more, and a projection type display apparatus using the zoom lens system.

According to an aspect of the invention, a projection zoom lens system comprises, in order from a magnification side of the projection zoom lens: a first lens group having a negative refractive power; a second lens group having a positive refractive power; a third lens group having a positive refractive power; a fourth lens group; and a fifth lens group having a positive refractive power, wherein during a power variable operation, the first lens group and the fifth lens group remain stationary, and the second lens group, the third lens group, and the fourth lens group are moved along an optical axis, wherein the fourth lens group includes, in order from the magnification side of the projection zoom lens, a negative lens having at least one aspheric surface, a positive lens, a negative lens concave toward the magnification side of the projection zoom lens, a positive lens convex toward a reduction side of the projection zoom lens, and a positive lens, and wherein the fifth lens group is formed of one lens, and satisfies the following conditional expression (1):

$$3 < f_5/f_w < 8 \tag{1},$$

where $f_5$ is a focal length of the fifth lens group, and $f_w$ is a focal length of the whole system of the projection zoom lens at a wide-angle end of the projection zoom lens. According to another aspect of the invention, the negative lens of the fourth lens group concave toward the magnification side of the projection zoom lens and the positive lens thereof convex toward the reduction side of the projection zoom lens are cemented to each other and formed as a cemented lens.

According to another aspect of the invention, at least one lens of the first lens group has at least one aspheric surface.

According to another aspect of the invention, the following conditional expressions (2) and (3) are satisfied:

$$2\omega \geq 65 \text{ (degrees)} \tag{2, and}$$

$$f_t/f_w \geq 1.48 \tag{3},$$

where $2\omega$ is a total angle of view at the wide-angle end of the projection zoom lens, and $f_t$ is a focal length of the whole system at a telephoto end of the projection zoom lens.

According to another aspect of the invention, the following conditional expression (4) is satisfied:

$$Bf/f_w > 1.5 \tag{4},$$

where

Bf is an air-converted back focal length of the whole system on the reduction side of the projection zoom lens.

According to another aspect of the invention, the following conditional expression (5) is satisfied:

$$1.0 < \Delta dG_3/f_w \quad (5),$$

where $\Delta dG_3$ is a moving distance of the third lens group from the wide-angle end of the projection zoom lens to the telephoto end of the projection zoom lens during the power variable operation.

Further, the projection type display apparatus according to the aspect of the invention includes a light source; a light valve; an illumination optical unit guiding rays originated from the light source into the light valve; and any one of the projection zoom lens systems mentioned above. The rays originating from the light source are optically modulated by the light valve, and are projected on a screen by the projection zoom lens system.

In the projection zoom lens system according to the aspect of the invention, the fourth lens group includes, in order from the magnification side, the negative lens having at least one aspheric surface, the positive lens, the negative lens concave toward the magnification side, the positive lens convex toward the reduction side, and the positive lens. With such a configuration, it is possible to suppress fluctuation in various aberrations accompanying the zooming operation. Particularly, the negative lens disposed closest to the magnification side in the fourth lens group has an aspheric surface provided close to a pupil. With such a configuration, it is possible to effectively correct an image field curvature (particularly, a sagittal field curvature) which causes a problem when achieving a high magnification and a wide angle of the projection zoom lens system. Furthermore, it is possible to obtain a favorable aberration correction effect throughout the entire zoom range.

Furthermore, the power ratio of the fifth lens group is set to satisfy the conditional expression (1). With such a configuration, it is possible to satisfactorily correct astigmatism, and suppress sizes of external diameters of the lenses in the fourth lens group. Therefore, it is possible to make the whole lens system compact.

As a result, by using the projection zoom lens system and the projection type display apparatus using the same according to the aspect of the invention, it is possible to satisfactorily correct various aberrations throughout the entire zoom range while achieving a total angle of view of 65 degrees or more at the wide-angle end and a zoom ratio of about 1.5 times or more.

DESCRIPTION OF EXEMPLARY EMBODIMENTS

Figure 1:
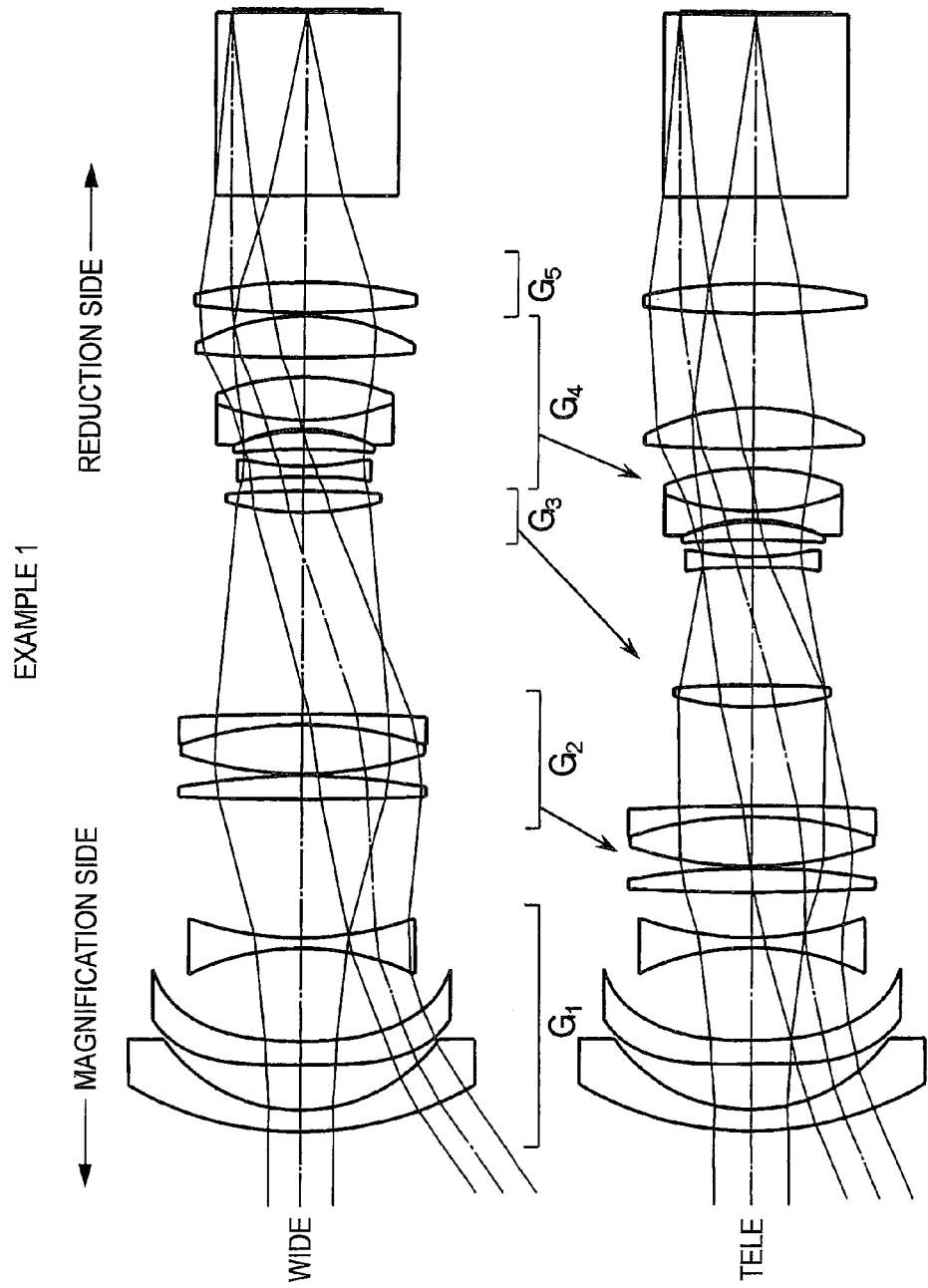
FIG. 1 is a schematic diagram illustrating configurations and ray paths of the projection zoom lens system at a wide-angle end (WIDE) and a telephoto end (TELE) according to Example 1 of the invention.

Hereinafter, embodiments of the invention will be described in detail with reference to the accompanying drawings. The projection zoom lens system according to the embodiment (which shows a representative configuration according to Example 1) shown in FIGS. 1 and 2 includes, in order from the magnification side (a screen side), a first lens group $G_1$ having a negative refractive power, a second lens group $G_2$ having a positive refractive power, a third lens group $G_3$ having a positive refractive power, a fourth lens group $G_4$, and a fifth lens group $G_5$ having a positive refractive power. In addition, in the subsequent stage thereof, there are also arranged a glass block 2 (including a filter portion) mostly using a color synthesizing prism and an image display surface 1 as a light valve such as a liquid crystal display panel.

The projection zoom lens system according to the embodiment has a retro-focus structure. Therefore, it is possible to secure an appropriate back focal length relative to a focal length, and it is possible to form a substantially telecentric system on the reduction side (a light valve side).

Further, the projection zoom lens system according to the embodiment is configured so that the first lens group $G_1$ and the fifth lens group $G_5$ remain stationary and the second lens group $G_2$, the third lens group $G_3$, and the fourth lens group $G_4$ are independently moved along an optical axis Z. Furthermore, the zoom lens system may be configured to have a zoom function performed by integrally moving, for example, two lens groups of these three lens groups $G_2$ to $G_4$.

As described above, the movable groups are three groups of the second lens group $G_2$, third lens group $G_3$ and fourth lens group $G_4$. Thereby, it is possible to satisfactorily correct aberration even when the number of lenses is small.

When zooming from the wide-angle end to the telephoto end, all the movable lens groups are moved to the magnification side. With such a configuration, it is possible to set a large zoom ratio.

However, this means that, in each movable lens group, the position at the telephoto end is set closer to the magnification side than the position at the wide-angle end, and does not exclude temporary movement to the reduction side at the intermediate region.

Furthermore, an aperture diaphragm is not shown in the drawing, but may be provided at an appropriate position (may be provided as a mask). In addition, it may be possible to adopt a configuration in which the aperture diaphragm is moved integrally with the fourth lens group $G_4$ during zooming.

Furthermore, it is preferred that the focus adjustment be performed by moving the first lens group $G_1$ in a direction of the optical axis Z.

Furthermore, the projection zoom lens system according to the embodiment is configured so that the fourth lens group $G_4$ includes, in order from the magnification side, a negative lens (an eighth lens $L_8$) having at least one aspheric surface (in the embodiment, both surfaces are aspheric), a positive lens (a ninth lens $L_9$), a negative lens (a tenth lens $L_{10}$) concave toward the magnification side, a positive lens (an eleventh lens $L_{11}$) convex toward the reduction side, and a positive lens (a twelfth lens $L_{12}$).

Since the fourth lens group $G_4$ is configured as described above, it is possible to suppress fluctuation in various aberrations accompanying the zooming operation. In particular, the negative lens (the eighth lens $L_8$) close to a pupil position (a position at which a principal ray intersects with the optical axis Z in FIG. 1) of the optical system has an aspheric surface. Thus, it is possible to effectively correct an image field curvature (particularly, a sagittal field curvature) which causes a problem when achieving a high magnification and a wide angle of the projection zoom lens system. Furthermore, it is possible to obtain a favorable aberration correction effect throughout the entire zoom range.

Furthermore, the projection zoom lens system according to the embodiment is configured so that the fifth lens group $G_5$ is formed of one lens (a thirteenth lens $L_{13}$), and satisfies the conditional expression (1) (described again below):

$$3 < f_5/f_w < 8 \tag{1},$$

where $f_5$ is a focal length of the fifth lens group $G_5$, and $f_w$ is a focal length of the whole system at a wide-angle end.

By forming the fifth lens group $G_5$ as one lens, it is possible to make the fifth lens group $G_5$ compact. As a result, it is possible to make the whole lens system compact. Further, by satisfying the conditional expression (1), it is possible to satisfactorily correct astigmatism, and suppress the sizes of the external diameters of the lenses in the fourth lens group $G_4$. Therefore, it is possible to make the whole lens system compact.

Furthermore, the conditional expression (1) defines a ratio of a power of the fifth lens group $G_5$ to a power of the whole system at the wide-angle end. When it is lower than the lower limit thereof, it is possible to decrease a lens diameter of the fourth lens group $G_4$, and it is advantageous to make the whole lens system compact. However, aberration occurring in the fifth lens group $G_5$ increases, and thus it is difficult to increase magnification. In particular, it is difficult to correct astigmatism, and it is also difficult to satisfactorily correct aberration throughout the entire zoom range. In contrast, when it is higher than the upper limit, the lens diameter of the fourth lens group $G_4$ increases and it is difficult to make the whole lens system compact.

Further, it is more preferred that, instead of the conditional expression (1), the following conditional expression (1') be satisfied:

$$4 < f_5/f_w < 6 \tag{1'}$$

Further, in the projection zoom lens system according to the embodiment, it is preferred that, in fourth lens group $G_4$, a cemented lens be formed by cementing the negative lens (the tenth lens $L_{10}$) disposed at the third position from the magnification side and the positive lens (the eleventh lens $L_{11}$) disposed at the fourth position from the magnification side. With such a configuration, it is possible to satisfactorily correct lateral chromatic aberration.

Furthermore, in the projection zoom lens system according to the embodiment, it is preferred that the first lens group $G_1$ have at least one aspheric surface (for example, in the first lens group $G_1$, both surfaces of the lens (second lens $L_2$) disposed at the second position from the magnification side are made to be aspheric). With such a configuration, it is possible to efficiently correct distortion, and it is also possible to suppress the number of lenses.

Furthermore, it is preferred that the projection zoom lens system according to the embodiment satisfy the following conditional expression (2) to (5):

$$2\omega \geq 65 \text{ (degrees)} \tag{2},$$

$$f_t/f_w \geq 1.48 \tag{3},$$

$$Bf/f_w > 1.5 \tag{4, and}$$

$$1.0 < \Delta dG_3/f_w \tag{5},$$

where $2\omega$ is a total angle of view at the wide-angle end, $f_t$ is a focal length of the whole system at a telephoto end, Bf is an air-converted back focal length of the whole system on the reduction side, and $\Delta dG_3$ is a moving distance of the third lens group $G_3$ from the wide-angle end to the telephoto end during zooming.

The conditional expression (2) defines that the total angle of view at the wide-angle end is 65 degrees or more. When it is lower than the lower limit, it is difficult to comply with the demand for an increase in the angle of view.

Furthermore, the conditional expression (3) defines that the zoom ratio is 1.48 times or more (preferably, 1.5 times or more). When it is lower than the lower limit, it is difficult to comply with the demand for an increase in magnification.

Furthermore, the conditional expression (4) defines that the ratio of the air-converted back focal length Bf of the whole system on the reduction side to the focal length $f_w$ of the whole system at the wide-angle end is larger than 1.5. When it is lower than the lower limit, it is difficult to secure a sufficient back focal length.

Further, the conditional expression (5) defines that the ratio of the moving distance of the third lens group $G_3$ during zooming from the wide-angle end to the telephoto end to the focal length $f_w$ of the whole system at the wide-angle end is larger than 1.0. When it is lower than the lower limit, it is difficult to achieve the increase in magnification.

Furthermore, it is more preferred that, instead of the conditional expression (5), the following conditional expression (5') be satisfied. That is, when it is higher than the lower limit, it is possible to increase magnification. Furthermore, when it is lower than the upper limit, it is also possible to make the whole lens system compact.

$$1.5 < \Delta dG_3/f_w < 2.2 \tag{5'}$$

Here, the shapes of the aspheric surfaces (both surfaces of the negative lens $L_8$ closest to the magnification side in the fourth lens group $G_4$ and both surfaces of the lens $L_2$ disposed at the second position from the magnification side in the first lens group $G_1$) in the projection lens system according to the embodiment are expressed by the following aspheric surface expression (it is the same for the respective aspheric surfaces in following Examples 1 to 4).

$$Z = \frac{Y^2/R}{1+\sqrt{1-K \times Y^2/R^2}} + \sum_{i=3}^{14} A_i Y^i \quad \text{[Numerical Expression 1]}$$

where

Z is a length of a perpendicular from a point on an aspheric surface, which is apart from the optical axis at a distance Y, to a tangential plane (a plane perpendicular to the optical axis) of the vertex of the aspheric surface, Y is a distance from the optical axis, R is a radius of curvature near the optical axis of an aspheric surface, K is an eccentricity, and $A_i$ is an aspheric coefficient (i=3 to 14).

Figure 10:
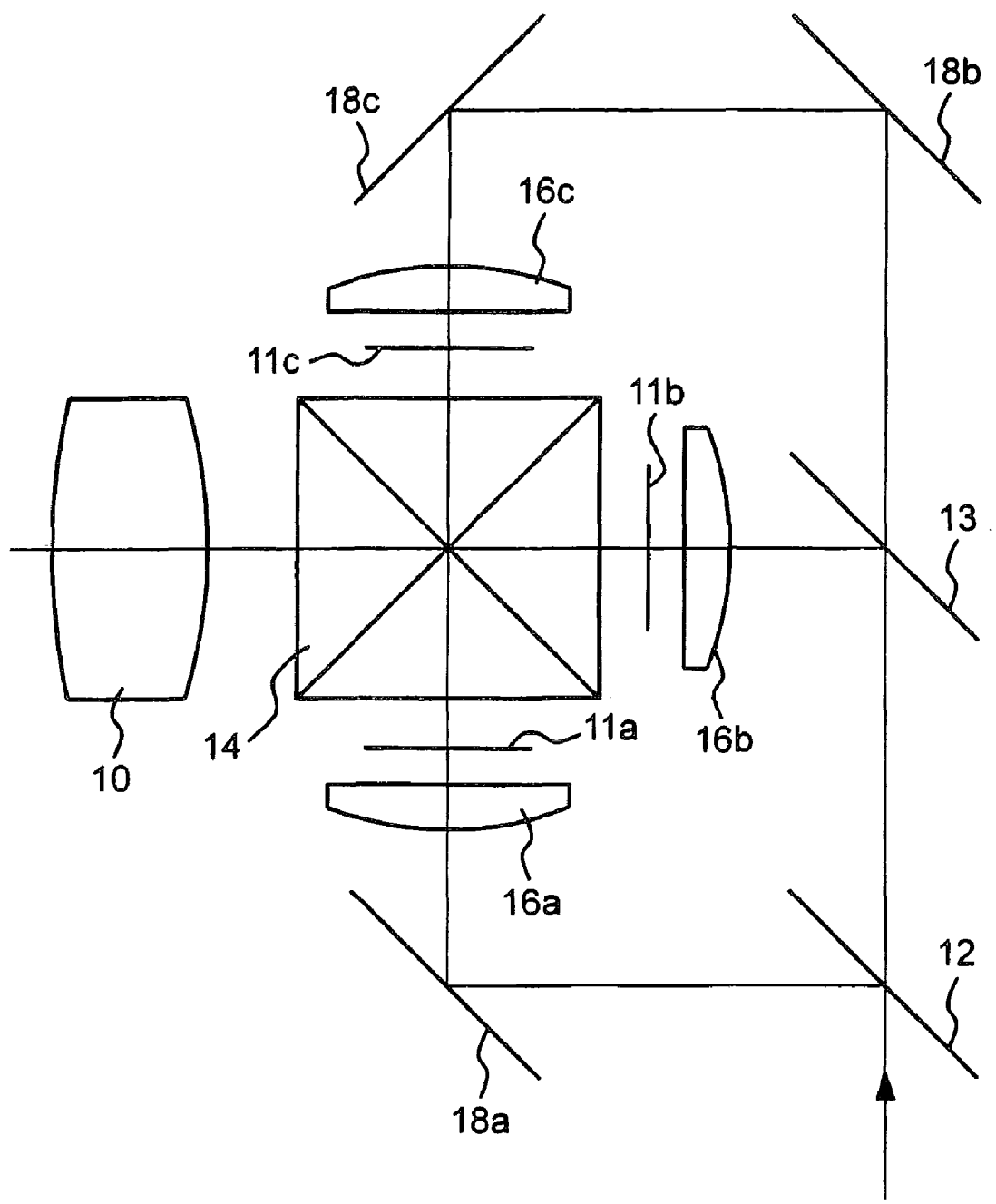
FIG. 10 is a schematic configuration diagram of a projection type apparatus according to an embodiment of the invention.

Next, an example of the projection type display apparatus equipped with the aforementioned projection zoom lens system will be described with reference to FIG. 10. The projection type display apparatus shown in FIG. 10 has transmissive liquid crystal panels 11a to 11c as light valves, and employs the aforementioned projection zoom lens system according to the embodiment as a projection zoom lens system 10. Further, between a light source which is not shown and a dichroic mirror 12, there is disposed an integrator (not shown in the drawing) such as a fly-eye. From the light source, white rays travel through an illumination optical unit, are modulated by being incident on the liquid crystal panels 11a to 11c which correspond to three color rays (G light, B light, R light), are color-synthesized by a cross dichroic prism 14, and are projected by the projection zoom lens system 10 on a screen not shown in the drawing. The device includes dichroic mirrors 12 and 13 for color separation, a cross dichroic prism 14 for color synthesis, condenser lenses 16a to 16c, and total reflection mirrors 18a to 18c.

The projection type display apparatus of the embodiment employs the projection zoom lens system according to the embodiment, and thus it is possible to embody a projection type display apparatus having a wide angle, a large zoom ratio, good projection image quality, and a compact size.

Furthermore, the projection zoom lens system according to the embodiments of the invention is not limited to applications serving as a projection zoom lens system of the projection type display apparatus using a transmissive liquid crystal display panel, and may be applied to a projection zoom lens system of a device using a different optical modulator such as a reflective liquid crystal display panel or DMD.

EXAMPLES

Hereinafter, the projection zoom lens system according to the invention will be further described with reference to specific examples.

Example 1

Figure 2:
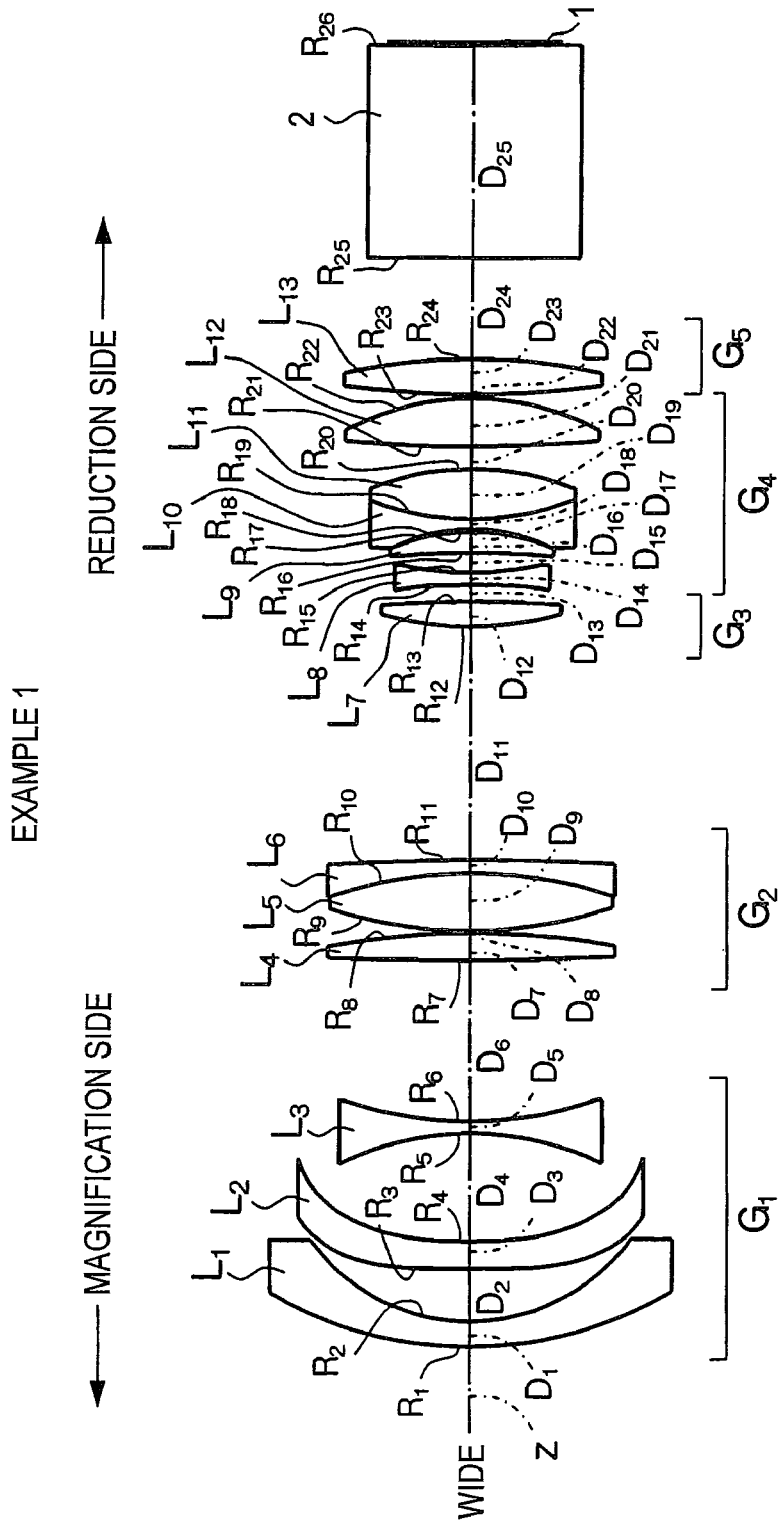
FIG. 2 is a schematic diagram illustrating the configuration of the projection zoom lens system at the wide-angle end (WIDE) according to Example 1 of the invention.

FIGS. 1 and 2 show a schematic configuration of the projection zoom lens system according to Example 1. As described above, the projection zoom lens system according to Example 1 includes, in order from the magnification side, a first lens group $G_1$ having a negative refractive power, a second lens group $G_2$ having a positive refractive power, a third lens group $G_3$ having a positive refractive power, a fourth lens group $G_4$ having a smaller refractive power than other lens groups (having a small positive refractive power in Example 1), and a fifth lens group $G_5$ having a positive refractive power. In addition, in the subsequent stage thereof, there are also arranged a glass block 2 (including the filter portion) mostly using a color synthesizing prism and an image display surface 1 as a light valve such as a liquid crystal display panel.

The first lens group $G_1$ includes three lenses of a first lens $L_1$ which is formed as a negative meniscus lens convex toward the magnification side, a second lens $L_2$ of which both surfaces are aspheric, and a third lens $L_3$ which is formed as a biconcave lens. The second lens group $G_2$ includes a fourth lens $L_4$ which is formed as a biconvex lens, a fifth lens $L_5$ which is formed as a biconvex lens, and a sixth lens $L_6$ which is formed as a negative meniscus lens concave toward the projection side. The fifth lens $L_5$ and the sixth lens $L_6$ are cemented to each other and formed as a cemented lens. Furthermore, the third lens group $G_3$ is formed of only a seventh lens $L_7$ formed as a biconvex lens.

The fourth lens group $G_4$ includes, in order from the magnification side, a negative eighth lens $L_8$ of which both surfaces are aspheric, a ninth lens $L_9$ which is formed as a positive meniscus lens convex toward the reduction side, a tenth lens $L_{10}$ which is formed as a biconcave lens, an eleventh lens $L_{11}$ which is formed as a biconvex lens, and a twelfth lens $L_{12}$ which is formed as a biconvex lens. The tenth lens $L_{10}$ and the eleventh lens $L_{11}$ are cemented to each other and formed as a cemented lens. Further, the fifth lens group $G_5$ is formed of only a thirteenth lens $L_{13}$ formed as a biconvex lens.

In the projection zoom lens system according to Example 1, during zooming, the first lens group $G_1$ and fifth lens group $G_5$ remain stationary, and the second lens group $G_2$, the third lens group $G_3$, and the fourth lens group $G_4$ are independently moved toward the magnification side along the optical axis Z (the same in Examples 2 to 4).

In addition, the focus adjustment is performed by moving the first lens group $G_1$ in a direction of the optical axis Z (the same in Examples 2 to 4).

In Example 1, the middle part of Table 1 shows radiuses of curvature R of the lens surfaces (those are standardized by setting the focal length at the wide-angle end to 1.00; the same in the following Tables 3, 5, and 7), center thicknesses of the lenses and air spaces D between the lenses (those are standardized in the same manner as the radiuses of curvature R; the same in the following Tables 3, 5, and 7), and refractive indexes $N_d$ and Abbe numbers $v_d$ of the lenses at the d-line. Furthermore, in the Table 1 and the Tables 3, 5, and 7 to be described later, each numeral corresponding to each of the reference signs R, D, $N_d$, and $v_d$ sequentially increases in order from the magnification side. Further, in Example 1, the upper part of the Table 1 shows respective values of a focal length f of the whole system, an F number Fno., and a total angle of view 2ω (degrees).

Further, the lower part of Table 1 shows, in the cases of zoom ratios of 1.00, 1.37, and 1.59, a variable 1 (a space between the first lens group $G_1$ and the second lens group $G_2$), a variable 2 (a space between the second lens group $G_2$ and the third lens group $G_3$), a variable 3 (a space between the third lens group $G_3$ and the fourth lens group $G_4$), and a variable 4 (a space between the fourth lens group $G_4$ and the fifth lens group $G_5$) (the same in the following Tables 3, 5, and 7).

Furthermore, Table 2 shows respective constants K and $A_3$ to $A_{14}$ corresponding to the respective aspheric surfaces.

TABLE 1 f = 1.00~1.59, Fno. = 1.65~2.32, 2ω = 70.6~47.2

| Surface Number | R | D | $N_d$ | $v_d$ |
|---|---|---|---|---|
| 1 | 3.187 | 0.19 | 1.7130 | 53.9 |
| 2 | 1.568 | 0.41 | | |
| *3 | −178.759 | 0.21 | 1.4910 | 57.6 |
| *4 | 4.745 | 0.84 | | |
| 5 | −2.447 | 0.09 | 1.4875 | 70.2 |
| 6 | 3.078 | Variable 1 | | |
| 7 | 23.533 | 0.21 | 1.8340 | 37.2 |
| 8 | −6.517 | 0.02 | | |
| 9 | 3.565 | 0.45 | 1.8340 | 37.2 |
| 10 | −3.565 | 0.10 | 1.8467 | 23.8 |
| 11 | −20.597 | Variable 2 | | |
| 12 | 2.669 | 0.20 | 1.5891 | 61.2 |
| 13 | −9.551 | Variable 3 | | |
| *14 | −9.361 | 0.09 | 1.8035 | 40.4 |
| *15 | 2.218 | 0.16 | | |
| 16 | −6.348 | 0.16 | 1.5891 | 61.2 |
| 17 | −1.726 | 0.02 | | |
| 18 | −1.468 | 0.08 | 1.7552 | 27.5 |
| 19 | 2.214 | 0.39 | 1.4970 | 81.6 |
| 20 | −2.214 | 0.17 | | |
| 21 | 11.482 | 0.38 | 1.7234 | 38.0 |
| 22 | −2.158 | Variable 4 | | |
| 23 | 7.659 | 0.28 | 1.6180 | 63.4 |
| 24 | −4.773 | 0.78 | | |
| 25 | ∞ | 1.65 | 1.5163 | 64.1 |
| 26 | ∞ | | | |

| | Zoom ratio | Variable 1 | Variable 2 | Variable 3 | Variable 4 |
|---|---|---|---|---|---|
| WIDE | 1.00 | 1.25 | 1.83 | 0.13 | 0.03 |
| MIDDLE | 1.37 | 0.61 | 1.29 | 0.78 | 0.57 |
| TELE | 1.59 | 0.41 | 0.90 | 1.08 | 0.85 |

*Aspheric surface

TABLE 2

Coefficient of aspherical surface

| Surface Number | K | $A_3$ | $A_4$ | $A_5$ | $A_6$ |
|---|---|---|---|---|---|
| 3 | −100.000 | 1.765E−02 | 8.028E−02 | 2.682E−01 | −5.926E−01 |
| 4 | −0.003 | 9.539E−03 | 1.858E−01 | −2.966E−01 | 6.786E−01 |
| 14 | 1.000 | 0.000E+00 | −2.257E−01 | 0.000E+00 | 4.210E−01 |
| 15 | 1.000 | 0.000E+00 | −1.803E−01 | 0.000E+00 | 4.055E−01 |

| Surface Number | $A_7$ | $A_8$ | $A_9$ | $A_{10}$ | $A_{11}$ |
|---|---|---|---|---|---|
| 3 | 5.053E−01 | −8.093E−02 | −1.880E−01 | 6.811E−02 | 9.208E−02 |
| 4 | −7.577E−01 | 3.087E−02 | 4.157E−01 | 1.438E−02 | −2.012E−01 |
| 14 | 0.000E+00 | −7.636E−01 | 0.000E+00 | 6.273E−01 | 0.000E+00 |
| 15 | 0.000E+00 | −7.346E−01 | 0.000E+00 | 5.555E−01 | 0.000E+00 |

| Surface Number | $A_{12}$ | $A_{13}$ | $A_{14}$ |
|---|---|---|---|
| 3 | −1.592E−02 | −6.327E−02 | 2.820E−02 |
| 4 | −6.352E−02 | 1.134E−01 | −2.150E−02 |
| 14 | 0.000E+00 | 0.000E+00 | 0.000E+00 |
| 15 | 0.000E+00 | 0.000E+00 | 0.000E+00 |

In addition, Table 9 shows numerical values corresponding to the respective conditional expressions (1), (1'), (2) to (5), and (5') in Example 1.

Figure 6:
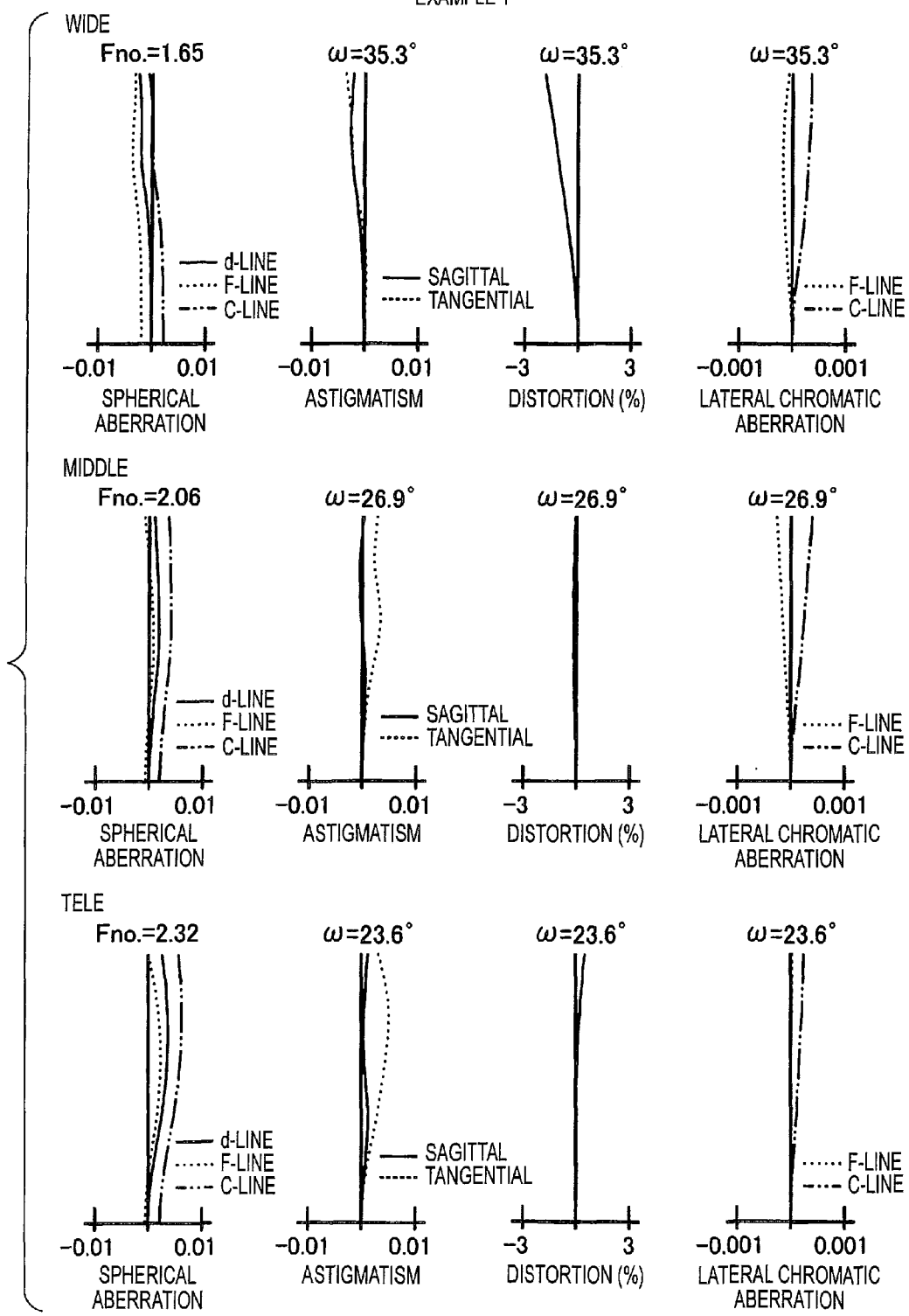
FIG. 6 is an aberration diagram illustrating various aberrations (spherical aberration, astigmatism, distortion and lateral chromatic aberration) of the projection zoom lens system of Example 1 at the wide-angle end (WIDE), a middle position (MIDDLE), and the telephoto end (TELE)

FIG. 6 is an aberration diagram illustrating various aberrations (spherical aberration, astigmatism, distortion, and lateral chromatic aberration) at the wide-angle end (WIDE), the middle position (MIDDLE), and the telephoto end (TELE) of the projection zoom lens system according to Example 1.

Furthermore, in FIGS. 6 and 7 to 9 to be described later, the spherical aberration diagrams show aberration curves of rays having wavelengths of the d-line, the F-line, and the C-line, the astigmatism diagrams show aberration curves of a sagittal image plane and a tangential image plane, and the lateral chromatic aberration diagrams show aberration curves of rays of the F-line and the C-line relative to a ray of the d-line.

As can be seen clearly from FIG. 6, the projection zoom lens system according to Example 1 is a fast lens having an F number of 1.65 at the wide-angle, in which aberrations are satisfactorily corrected.

Further, as shown in Table 9, the projection zoom lens system according to Example 1 satisfies the conditional expressions (1), (1'), (2) to (5), and (5'), in which the total angle of view 2ω at the wide-angle end is 70.6 degrees, and the zoom ratio is 1.59. As a result, an increase in the angle of view and an increase in magnification are achieved.

Example 2

Figure 3:
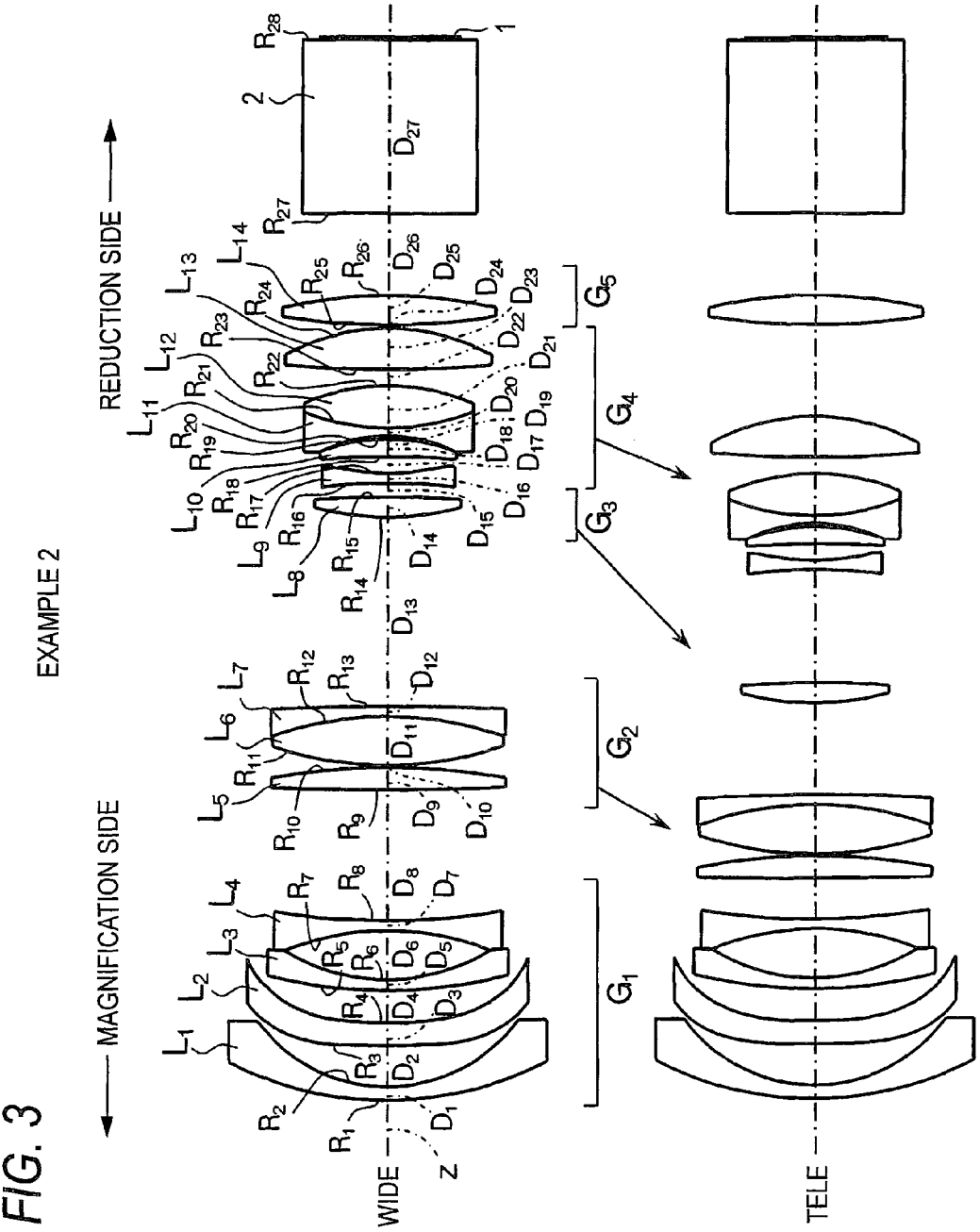
FIG. 3 is a schematic diagram illustrating configurations of a projection zoom lens system at the wide-angle end (WIDE) and the telephoto end (TELE) according to Example 2 of the invention.

FIG. 3 shows a schematic configuration of the projection zoom lens system according to Example 2. The projection zoom lens system according to Example 2 includes, in order from the magnification side, a first lens group $G_1$ having a negative refractive power, a second lens group $G_2$ having a positive refractive power, a third lens group $G_3$ having a positive refractive power, a fourth lens group $G_4$ having a smaller refractive power than other lens groups (having a small positive refractive power in Example 2), and a fifth lens group $G_5$ having a positive refractive power. In addition, in the subsequent stage thereof, there are also arranged a glass block 2 (including the filter portion) mostly using a color synthesizing prism and an image display surface 1 as a light valve such as a liquid crystal display panel.

The first lens group $G_1$ includes four lenses of a first lens $L_1$ which is formed as a negative meniscus lens convex toward the magnification side, a second lens $L_2$ of which both surfaces are aspheric, a third lens $L_3$ which is formed as a negative meniscus lens convex toward the magnification side, and a fourth lens $L_4$ which is formed as a biconcave lens. The second lens group $G_2$ includes a fifth lens $L_5$ which is formed as a biconvex lens, a sixth lens $L_6$ which is formed as a biconvex lens, and a seventh lens $L_7$ which is formed as a negative meniscus lens concave toward the projection side.

The sixth lens $L_6$ and the seventh lens $L_7$ are cemented to each other and formed as a cemented lens. Furthermore, the third lens group $G_3$ is formed of only an eighth lens $L_8$ formed as a biconvex lens.

The fourth lens group $G_4$ includes, in order from the magnification side, a negative ninth lens $L_9$ of which both surfaces are aspheric, a tenth lens $L_{10}$ which is formed as a positive meniscus lens convex toward the reduction side, an eleventh lens $L_{11}$ which is formed as a biconcave lens, a twelfth lens $L_{12}$ which is formed as a biconvex lens, and a thirteenth lens $L_{13}$ which is formed as a biconvex lens. The eleventh lens $L_{11}$ and the twelfth lens $L_{12}$ are cemented to each other and formed as a cemented lens. Further, the fifth lens group $G_5$ is formed of only a fourteenth lens $L_{14}$ formed as a biconvex lens.

In Example 2, the middle part of Table 3 shows radiuses of curvature R of the lens surfaces, center thicknesses of the lenses and air spaces D between the lenses, and refractive indexes $N_d$ and Abbe numbers $\nu_d$ of the lenses at the d-line. Further, in Example 2, the upper part of the Table 3 shows respective values of a focal length f of the whole system, an F number Fno., and a total angle of view 2ω (degrees). Furthermore, Table 4 shows respective constants K and $A_3$ to $A_{14}$ corresponding to the respective aspheric surfaces.

TABLE 3 f = 1.00~1.59, Fno. = 1.62~2.32, 2ω = 70.6~47.2

| Surface Number | R | D | $N_d$ | $\nu_d$ |
|---|---|---|---|---|
| 1 | 3.359 | 0.13 | 1.5891 | 61.2 |
| 2 | 1.575 | 0.40 | | |
| *3 | −70.260 | 0.21 | 1.4910 | 57.6 |
| *4 | 6.821 | 0.31 | | |
| 5 | 4.788 | 0.10 | 1.4875 | 70.2 |
| 6 | 1.894 | 0.47 | | |
| 7 | −2.757 | 0.09 | 1.4875 | 70.2 |
| 8 | 6.739 | Variable 1 | | |
| 9 | 29.228 | 0.21 | 1.8340 | 37.2 |
| 10 | −6.387 | 0.02 | | |
| 11 | 3.530 | 0.47 | 1.8340 | 37.2 |
| 12 | −3.381 | 0.10 | 1.8467 | 23.8 |
| 13 | −23.250 | Variable 2 | | |
| 14 | 2.719 | 0.20 | 1.5891 | 61.2 |
| 15 | −9.973 | Variable 3 | | |
| *16 | −15.502 | 0.10 | 1.8035 | 40.4 |
| *17 | 2.113 | 0.16 | | |

TABLE 3-continued

| 18 | −9.189 | 0.17 | 1.4875 | 70.2 |
|---|---|---|---|---|
| 19 | −1.913 | 0.03 | | |
| 20 | −1.516 | 0.07 | 1.7552 | 27.5 |
| 21 | 2.213 | 0.40 | 1.4970 | 81.6 |
| 22 | −2.146 | 0.16 | | |
| 23 | 11.554 | 0.39 | 1.7234 | 38.0 |
| 24 | −2.134 | Variable 4 | | |
| 25 | 6.484 | 0.28 | 1.5891 | 61.2 |
| 26 | −4.808 | 0.78 | | |
| 27 | ∞ | 1.65 | 1.5163 | 64.1 |
| 28 | ∞ | | | |

| | Zoom ratio | Variable 1 | Variable 2 | Variable 3 | Variable 4 |
|---|---|---|---|---|---|
| WIDE | 1.00 | 1.25 | 1.82 | 0.13 | 0.03 |
| MIDDLE | 1.37 | 0.59 | 1.28 | 0.78 | 0.58 |
| TELE | 1.59 | 0.38 | 0.88 | 1.08 | 0.88 |

*Aspheric surface

TABLE 4

Coefficient of aspherical surface

| Surface Number | K | $A_3$ | $A_4$ | $A_5$ | $A_6$ |
|---|---|---|---|---|---|
| 3 | 31.925 | 3.795E−03 | 1.759E−01 | 1.129E−01 | −5.025E−01 |
| 4 | −62.916 | −1.521E−03 | 3.194E−01 | −4.880E−01 | 8.029E−01 |
| 16 | 1.000 | 0.000E+00 | −1.917E−01 | 0.000E+00 | 2.644E−01 |
| 17 | 1.000 | 0.000E+00 | −1.464E−01 | 0.000E+00 | 2.439E−01 |

| Surface Number | $A_7$ | $A_8$ | $A_9$ | $A_{10}$ | $A_{11}$ |
|---|---|---|---|---|---|
| 3 | 5.367E−01 | −1.137E−01 | −2.017E−01 | 6.875E−02 | 9.897E−02 |
| 4 | −7.294E−01 | −1.474E−03 | 3.815E−01 | 1.427E−02 | −1.828E−01 |
| 16 | −4.352E−01 | 0.000E+00 | 3.352E−01 | 0.000E+00 | 0.000E+00 |
| 17 | −3.889E−01 | 0.000E+00 | 2.433E−01 | 0.000E+00 | 0.000E+00 |

| Surface Number | $A_{12}$ | $A_{13}$ | $A_{14}$ |
|---|---|---|---|
| 3 | −1.222E−02 | −6.378E−02 | 2.627E−02 |
| 4 | −3.439E−02 | 8.120E−02 | −1.523E−02 |
| 16 | 0.000E+00 | 0.000E+00 | 0.000E+00 |
| 17 | 0.000E+00 | 0.000E+00 | 0.000E+00 |

In addition, Table 9 shows numerical values corresponding to the respective conditional expressions (1), (1'), (2) to (5), and (5') in Example 2.

Figure 7:
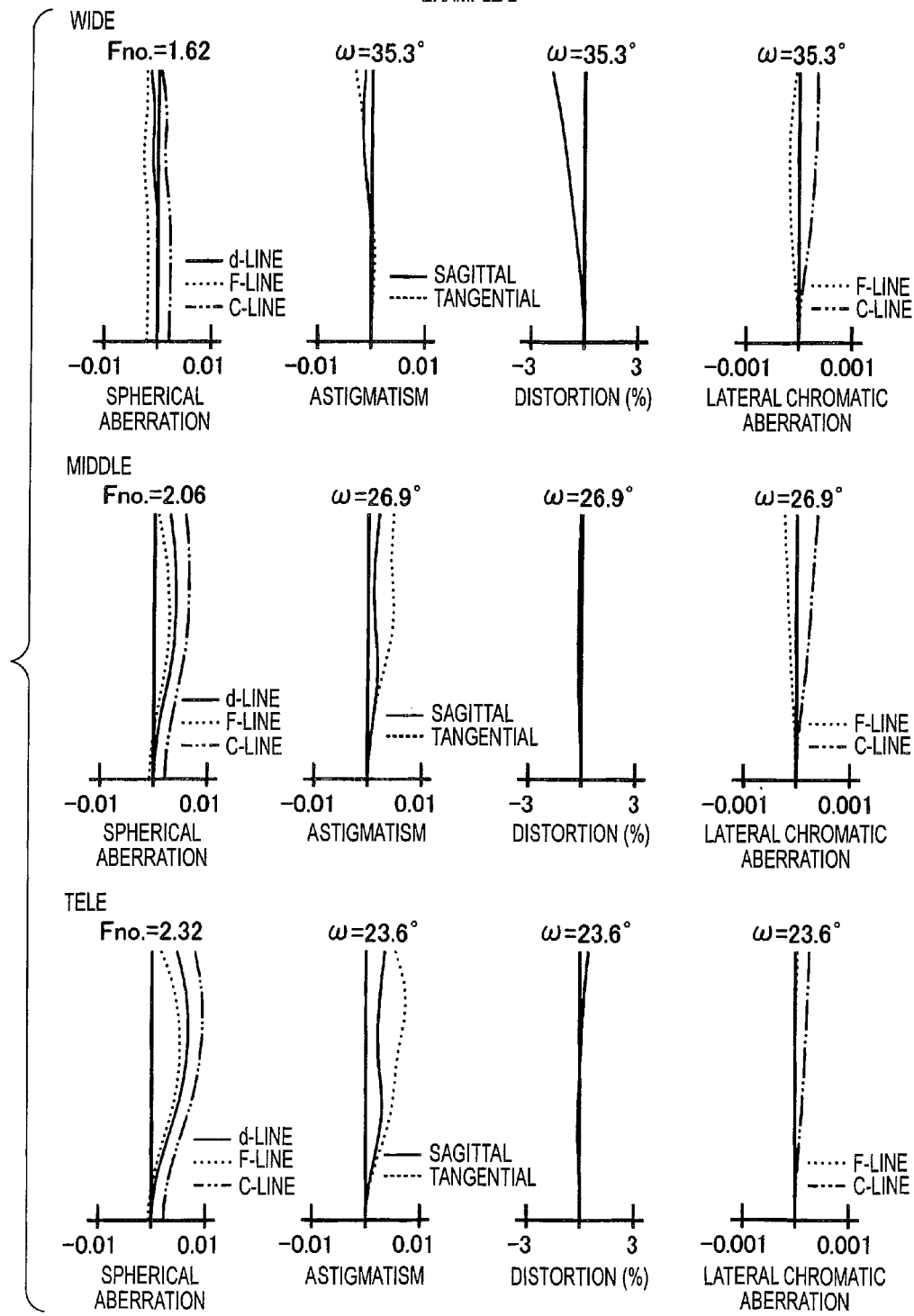
FIG. 7 is an aberration diagram illustrating various aberrations (spherical aberration, astigmatism, distortion and lateral chromatic aberration) of the projection zoom lens system of Example 2 at the wide-angle end (WIDE), the middle position (MIDDLE), and the telephoto end (TELE)

FIG. 7 is an aberration diagram illustrating various aberrations (spherical aberration, astigmatism, distortion, and lateral chromatic aberration) at the wide-angle end (WIDE), the middle position (MIDDLE), and the telephoto end (TELE) of the projection zoom lens system according to Example 2.

As can be seen clearly from FIG. 7, the projection zoom lens system according to Example 2 is a fast lens having an F number of 1.62 at the wide-angle, in which aberrations are satisfactorily corrected.

Further, as shown in Table 9, the projection zoom lens system according to Example 2 satisfies the conditional expressions (1), (1'), (2) to (5), and (5'), in which the total angle of view 2ω at the wide-angle end is 70.6 degrees, and the zoom ratio is 1.59. As a result, an increase in angle of view and an increase in magnification are achieved.

Example 3

Figure 4:
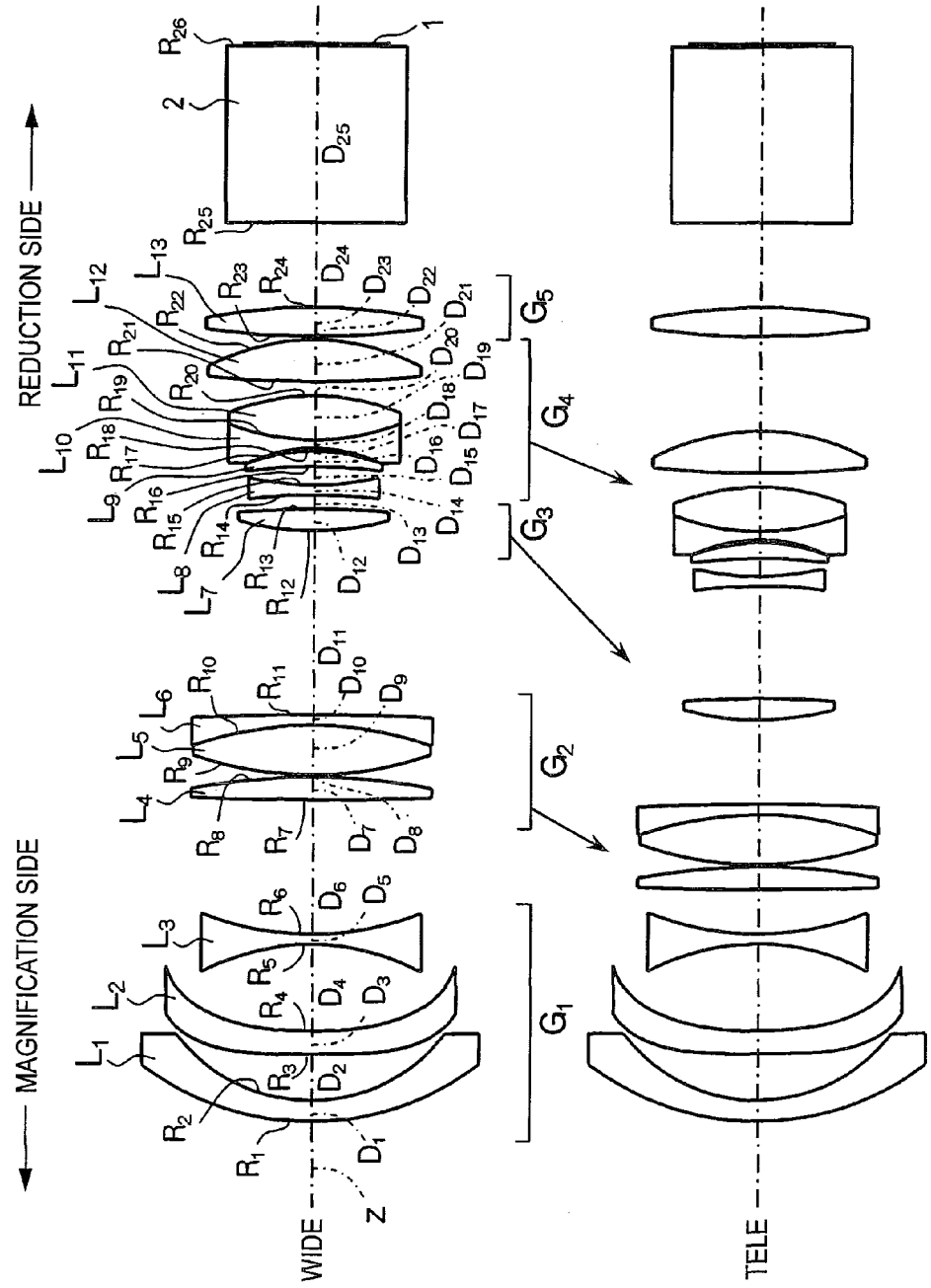
FIG. 4 is a schematic diagram illustrating configurations of a projection zoom lens system at the wide-angle end (WIDE) and the telephoto end (TELE) according to Example 3 of the invention.

FIG. 4 shows a schematic configuration of the projection zoom lens system according to Example 3. The projection zoom lens system according to Example 3 has substantially the same configuration as that of Example 1.

In Example 3, the middle part of Table 5 shows radiuses of curvature R of the lens surfaces, center thicknesses of the lenses and air spaces D between the lenses, and refractive indexes $N_d$ and Abbe numbers $v_d$ of the lenses at the d-line. Further, in Example 3, the upper part of the Table 5 shows respective values of a focal length f of the whole system, an F number Fno., and a total angle of view 2ω (degrees). Furthermore, Table 6 shows respective constants K and $A_3$ to $A_{14}$ corresponding to the respective aspheric surfaces.

TABLE 5 f = 1.00~1.60, Fno. = 1.65~2.32, 2ω = 66.2~43.4

| Surface Number | R | D | $N_d$ | $v_d$ |
|---|---|---|---|---|
| 1 | 2.423 | 0.18 | 1.7130 | 53.9 |
| 2 | 1.463 | 0.40 | | |
| *3 | −89.125 | 0.20 | 1.4910 | 57.6 |
| *4 | 4.626 | 0.74 | | |
| 5 | −2.054 | 0.09 | 1.4875 | 70.2 |
| 6 | 2.583 | Variable 1 | | |
| 7 | 30.664 | 0.20 | 1.8340 | 37.2 |
| 8 | −5.564 | 0.02 | | |
| 9 | 3.155 | 0.43 | 1.8340 | 37.2 |
| 10 | −3.155 | 0.09 | 1.8467 | 23.8 |
| 11 | −21.764 | Variable 2 | | |
| 12 | 2.446 | 0.19 | 1.5891 | 61.2 |
| 13 | −8.882 | Variable 3 | | |
| *14 | −11.412 | 0.09 | 1.8035 | 40.4 |
| *15 | 2.014 | 0.16 | | |
| 16 | −4.567 | 0.13 | 1.5891 | 61.2 |
| 17 | −1.706 | 0.02 | | |
| 18 | −1.405 | 0.07 | 1.7552 | 27.5 |
| 19 | 2.036 | 0.38 | 1.4970 | 81.6 |
| 20 | −2.036 | 0.12 | | |
| 21 | 8.731 | 0.36 | 1.7234 | 38.0 |
| 22 | −2.011 | Variable 4 | | |
| 23 | 6.632 | 0.25 | 1.6180 | 63.4 |
| 24 | −5.078 | 0.72 | | |
| 25 | ∞ | 1.52 | 1.5163 | 64.1 |
| 26 | ∞ | | | |

| | Zoom ratio | Variable 1 | Variable 2 | Variable 3 | Variable 4 |
|---|---|---|---|---|---|
| WIDE | 1.00 | 1.15 | 1.59 | 0.12 | 0.03 |
| MIDDLE | 1.37 | 0.57 | 1.10 | 0.68 | 0.54 |
| TELE | 1.60 | 0.38 | 0.73 | 0.96 | 0.82 |

*Aspheric surface

TABLE 6

Coefficient of aspherical surface

| Surface Number | K | $A_3$ | $A_4$ | $A_5$ | $A_6$ |
|---|---|---|---|---|---|
| 3 | −100.000 | 9.534E−03 | 9.374E−02 | 3.745E−01 | −8.921E−01 |
| 4 | −0.004 | 1.181E−03 | 2.265E−01 | −4.117E−01 | 1.024E+00 |
| 14 | 1.000 | 0.000E+00 | −2.855E−01 | 0.000E+00 | 6.330E−01 |
| 15 | 1.000 | 0.000E+00 | −2.316E−01 | 0.000E+00 | 6.133E−01 |

| Surface Number | $A_7$ | $A_8$ | $A_9$ | $A_{10}$ | $A_{11}$ |
|---|---|---|---|---|---|
| 3 | 8.260E−01 | −1.436E−01 | −3.621E−01 | 1.423E−01 | 2.088E−01 |
| 4 | −1.238E+00 | 5.493E−02 | 8.004E−01 | 3.007E−02 | −4.563E−01 |
| 14 | −1.355E+00 | 0.000E+00 | 1.311E+00 | 0.000E+00 | 0.000E+00 |
| 15 | −1.303E+00 | 0.000E+00 | 1.161E+00 | 0.000E+00 | 0.000E+00 |

| Surface Number | $A_{12}$ | $A_{13}$ | $A_{14}$ |
|---|---|---|---|
| 3 | −3.918E−02 | −1.690E−01 | 8.178E−02 |
| 4 | −1.564E−01 | 3.030E−01 | −6.233E−02 |
| 14 | 0.000E+00 | 0.000E+00 | 0.000E+00 |
| 15 | 0.000E+00 | 0.000E+00 | 0.000E+00 |

In addition, Table 9 shows numerical values corresponding to the respective conditional expressions (1), (1'), (2) to (5), and (5') in Example 3.

Figure 8:
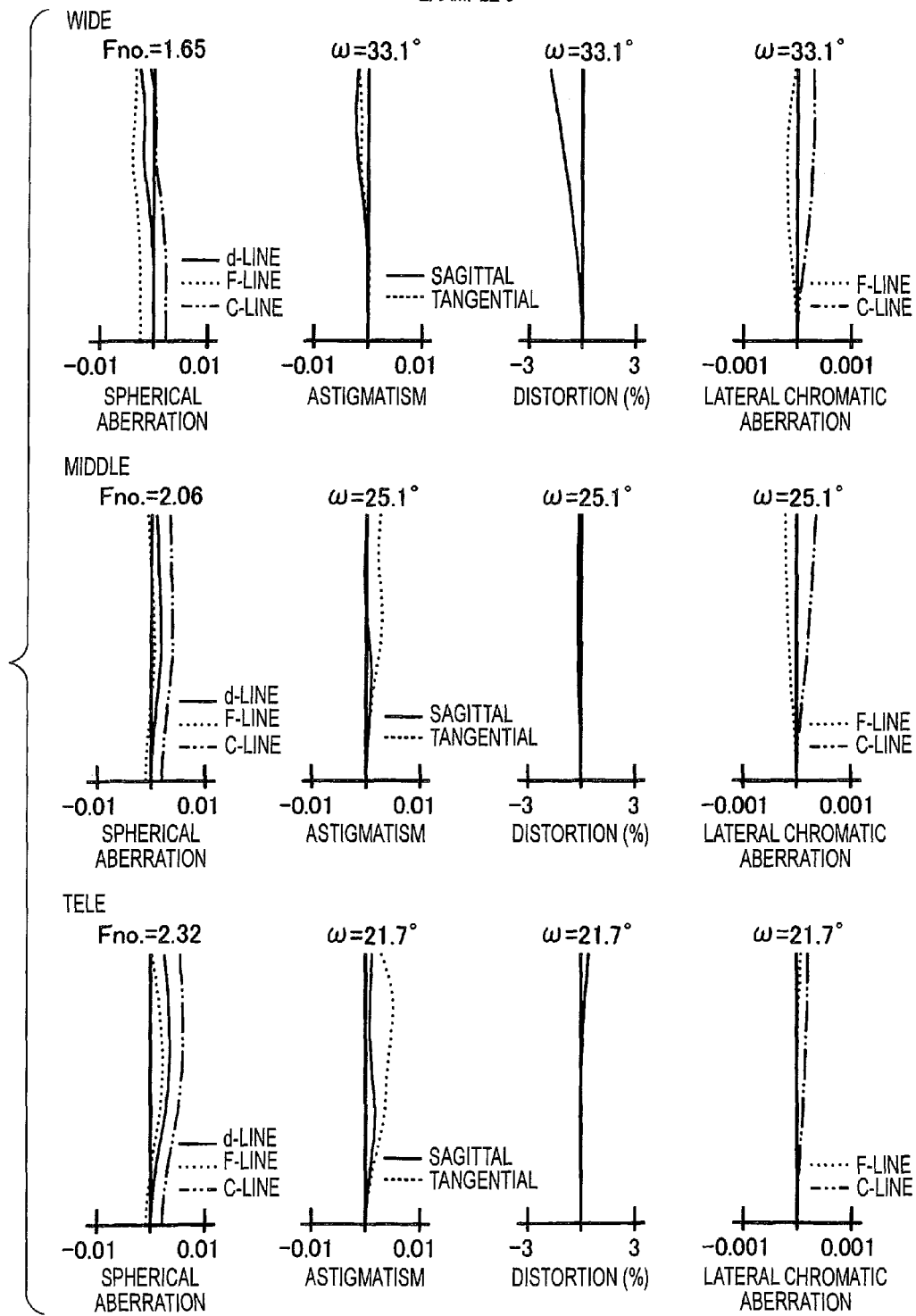
FIG. 8 is an aberration diagram illustrating various aberrations (spherical aberration, astigmatism, distortion and lateral chromatic aberration) of the projection zoom lens system of Example 3 at the wide-angle end (WIDE), the middle position (MIDDLE), and the telephoto end (TELE)

FIG. 8 is an aberration diagram illustrating various aberrations (spherical aberration, astigmatism, distortion, and lateral chromatic aberration) at the wide-angle end (WIDE), the middle position (MIDDLE), and the telephoto end (TELE) of the projection zoom lens system according to Example 3.

As can be seen clearly from FIG. 8, the projection zoom lens system according to Example 3 is a fast lens having an F number of 1.65 at the wide-angle, in which aberrations are satisfactorily corrected.

Further, as shown in Table 9, the projection zoom lens system according to Example 3 satisfies the conditional expressions (1), (1'), (2) to (5), and (5'), in which the total angle of view 2ω at the wide-angle end is 66.2 degrees, and the zoom ratio is 1.60. As a result, an increase in angle of view and an increase in magnification are achieved.

Example 4

Figure 5:
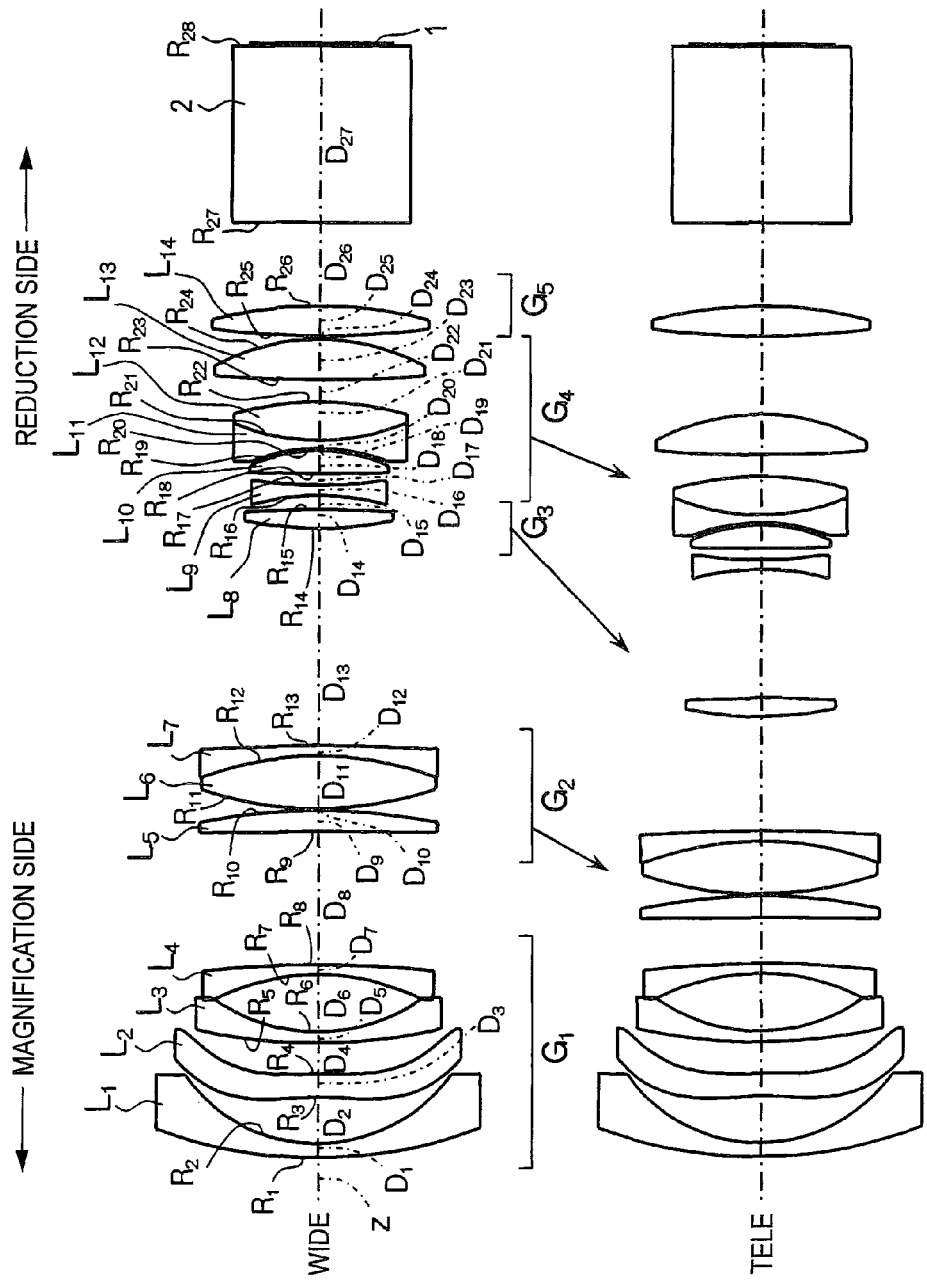
FIG. 5 is a schematic diagram illustrating configurations of a projection zoom lens system at the wide-angle end (WIDE) and the telephoto end (TELE) according to Example 4 of the invention.

FIG. 5 shows a schematic configuration of the projection zoom lens system according to Example 4. The projection zoom lens system according to Example 4 has substantially the same configuration as that of Example 2.

In Example 4, the middle part of Table 7 shows radiuses of curvature R of the lens surfaces, center thicknesses of the lenses and air spaces D between the lenses, and refractive indexes $N_d$ and Abbe numbers $v_d$ of the lenses at the d-line. Further, in Example 4, the upper part of the Table 7 shows respective values of a focal length f of the whole system, an F number Fno., and a total angle of view 2ω (degrees). Furthermore, Table 8 shows respective constants K and $A_3$ to $A_{14}$ corresponding to the respective aspheric surfaces.

TABLE 7 f = 1.00~1.50, Fno. = 1.62~2.32, 2ω = 75.4~53.6

| Surface Number | R | D | $N_d$ | $v_d$ |
|---|---|---|---|---|
| 1 | 4.899 | 0.14 | 1.5891 | 61.2 |
| 2 | 1.711 | 0.47 | | |
| *3 | −4.250 | 0.23 | 1.4910 | 57.6 |
| *4 | −26.582 | 0.32 | | |
| 5 | 5.755 | 0.11 | 1.4875 | 70.2 |
| 6 | 1.890 | 0.59 | | |
| 7 | −2.444 | 0.10 | 1.4875 | 70.2 |
| 8 | −11.988 | Variable 1 | | |
| 9 | −124.819 | 0.22 | 1.8340 | 37.2 |
| 10 | −6.283 | 0.02 | | |
| 11 | 3.845 | 0.54 | 1.8340 | 37.2 |
| 12 | −3.522 | 0.11 | 1.8467 | 23.8 |
| 13 | −20.721 | Variable 2 | | |
| 14 | 3.675 | 0.20 | 1.5891 | 61.2 |
| 15 | −12.348 | Variable 3 | | |
| *16 | −2.843 | 0.11 | 1.8035 | 40.4 |
| *17 | 4.931 | 0.12 | | |
| 18 | 23.866 | 0.24 | 1.4875 | 70.2 |
| 19 | −1.805 | 0.02 | | |
| 20 | −2.093 | 0.08 | 1.7552 | 27.5 |
| 21 | 2.343 | 0.40 | 1.4970 | 81.6 |
| 22 | −3.407 | 0.23 | | |
| 23 | 13.270 | 0.42 | 1.7234 | 38.0 |
| 24 | −2.364 | Variable 4 | | |
| 25 | 8.589 | 0.31 | 1.5891 | 61.2 |
| 26 | −4.664 | 0.85 | | |
| 27 | ∞ | 1.81 | 1.5163 | 64.1 |
| 28 | ∞ | | | |

| | Zoom ratio | Variable 1 | Variable 2 | Variable 3 | Variable 4 |
|---|---|---|---|---|---|
| WIDE | 1.00 | 1.36 | 2.24 | 0.14 | 0.03 |
| MIDDLE | 1.37 | 0.62 | 1.49 | 1.06 | 0.60 |
| TELE | 1.50 | 0.47 | 1.18 | 1.32 | 0.80 |

*Aspheric surface

TABLE 8

Coefficient of aspherical surface

| Surface Number | K | $A_3$ | $A_4$ | $A_5$ | $A_6$ |
|---|---|---|---|---|---|
| 3 | −37.462 | −1.433E−03 | 2.435E−01 | 1.428E−02 | −3.598E−01 |
| 4 | 1.006 | −1.894E−02 | 4.330E−01 | −5.140E−01 | 5.480E−01 |
| 16 | 1.000 | 0.000E+00 | 7.442E−02 | 0.000E+00 | −3.366E−01 |
| 17 | 1.000 | 0.000E+00 | 1.194E−01 | 0.000E+00 | −3.285E−01 |

| Surface Number | $A_7$ | $A_8$ | $A_9$ | $A_{10}$ | $A_{11}$ |
|---|---|---|---|---|---|
| 3 | 3.512E−01 | −4.363E−02 | −1.099E−01 | 1.719E−02 | 3.983E−02 |
| 4 | −3.781E−01 | −1.567E−02 | 1.618E−01 | −1.298E−03 | −6.649E−02 |
| 16 | 0.000E+00 | 4.746E−01 | 0.000E+00 | −2.832E−01 | 0.000E+00 |
| 17 | 0.000E+00 | 4.450E−01 | 0.000E+00 | −2.642E−01 | 0.000E+00 |

| Surface Number | $A_{12}$ | $A_{13}$ | $A_{14}$ |
|---|---|---|---|
| 3 | 1.729E−03 | −1.718E−02 | 4.626E−03 |
| 4 | −2.919E−03 | 3.430E−02 | −1.302E−02 |
| 16 | 0.000E+00 | 0.000E+00 | 0.000E+00 |
| 17 | 0.000E+00 | 0.000E+00 | 0.000E+00 |

In addition, Table 9 shows numerical values corresponding to the respective conditional expressions (1), (1'), (2) to (5), and (5') in Example 4.

Figure 9:
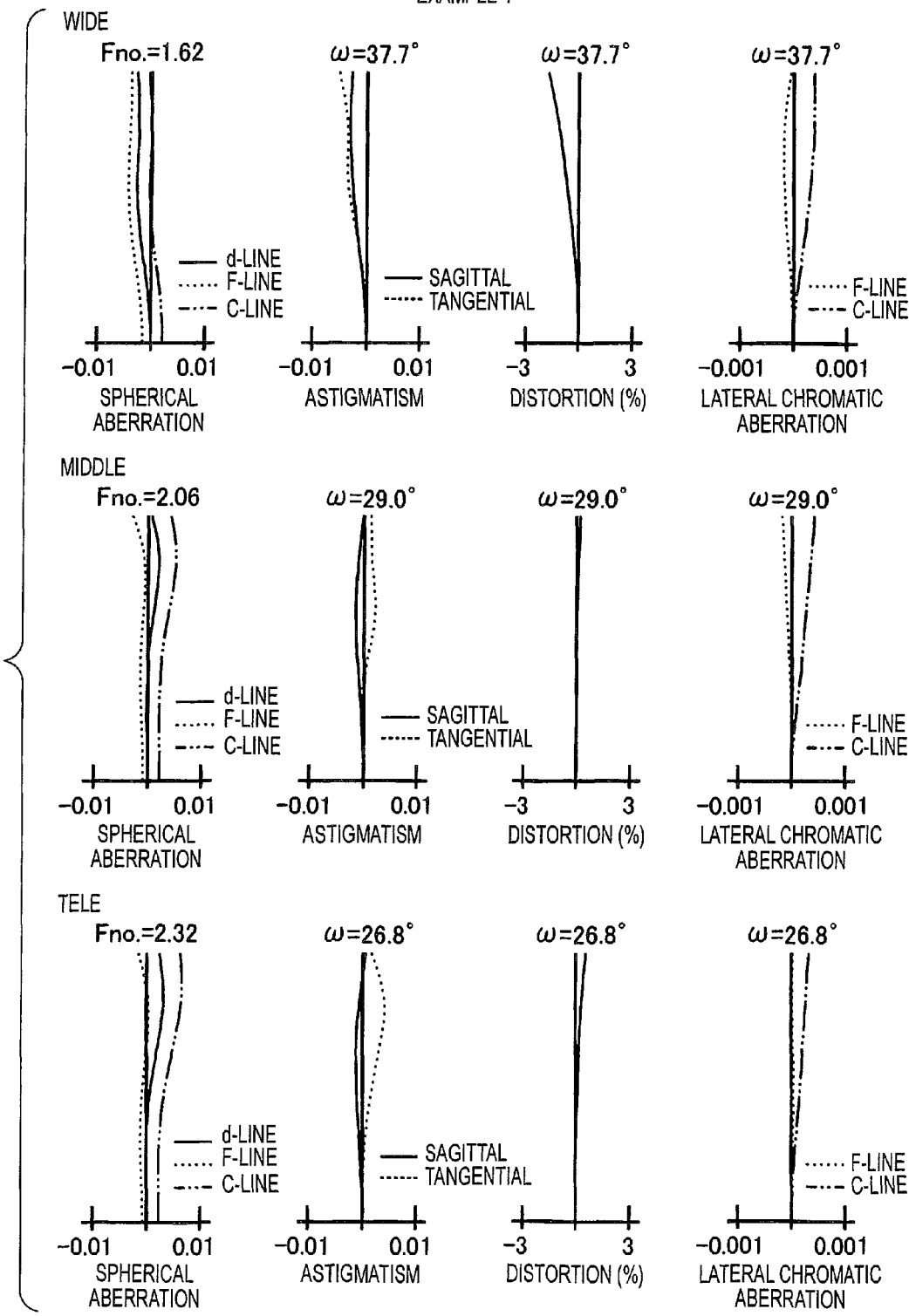
FIG. 9 is an aberration diagram illustrating various aberrations (spherical aberration, astigmatism, distortion and lateral chromatic aberration) of the projection zoom lens system of Example 4 at the wide-angle end (WIDE), the middle position (MIDDLE), and the telephoto end (TELE)

FIG. 9 is an aberration diagram illustrating various aberrations (spherical aberration, astigmatism, distortion, and lateral chromatic aberration) at the wide-angle end (WIDE), the middle position (MIDDLE), and the telephoto end (TELE) of the projection zoom lens system according to Example 4.

As can be seen clearly from FIG. 9, the projection zoom lens system according to Example 4 is a fast lens having an F number of 1.62 at the wide-angle, in which aberrations are satisfactorily corrected.

Further, as shown in Table 9, the projection zoom lens system according to Example 4 satisfies the conditional expressions (1), (1'), (2) to (5), and (5'), in which the total angle of view at the wide-angle end is 75.4 degrees, and the zoom ratio is 1.50. As a result, an increase in the angle of view and an increase in magnification are achieved.

TABLE 9

| | Example 1 | Example 2 | Example 3 | Example 4 |
|---|---|---|---|---|
| Conditional Expression (1), (1') | 4.80 | 4.73 | 4.69 | 5.18 |
| Conditional Expression (2) | 70.6 | 70.6 | 66.2 | 75.4 |
| Conditional Expression (3) | 1.59 | 1.59 | 1.60 | 1.50 |
| Conditional Expression (4) | 1.86 | 1.86 | 1.74 | 2.04 |
| Conditional Expression (5), (5') | 1.77 | 1.80 | 1.63 | 1.95 |

What is claimed is:

1. A projection zoom lens system comprising, in order from a magnification side of the projection zoom lens:
   a first lens group having a negative refractive power;
   a second lens group having a positive refractive power;
   a third lens group having a positive refractive power;
   a fourth lens group; and
   a fifth lens group having a positive refractive power,
   wherein during a power variable operation, the first lens group and the fifth lens group remain stationary, and the second lens group, the third lens group, and the fourth lens group are moved along an optical axis,
   wherein the fourth lens group includes, in order from the magnification side of the projection zoom lens, a negative lens having at least one aspheric surface, a positive lens, a negative lens concave toward the magnification side of the projection zoom lens, a positive lens convex toward a reduction side of the projection zoom lens, and a positive lens, and
   wherein the fifth lens group is formed of one lens, and satisfies the following conditional expression (1):

$$3 < f_5/f_w < 8 \quad (1),$$

where $f_5$ is a focal length of the fifth lens group, and $f_w$ is a focal length of the whole system of the projection zoom lens at a wide-angle end of the projection zoom lens.

2. The projection zoom lens system according to claim 1, wherein the negative lens of the fourth lens group concave toward the magnification side of the projection zoom lens and the positive lens thereof convex toward the reduction side of the projection zoom lens are cemented to each other and formed as a cemented lens.

3. The projection zoom lens system according to claim 1, wherein at least one lens of the first lens group has at least one aspheric surface.

4. The projection zoom lens system according to claim 1, wherein the following conditional expressions (2) and (3) are satisfied:

$$2\omega \geqq 65 \text{ (degrees)} \tag{2}$$

$$f_t/f_w \geqq 1.48 \tag{3}$$

where $2\omega$ is a total angle of view at the wide-angle end of the projection zoom lens, and $f_t$ is a focal length of the whole system at a telephoto end of the projection zoom lens.

5. The projection zoom lens system according to claim 1, wherein the following conditional expression (4) is satisfied:

$$Bf/f_w > 1.5 \tag{4}$$

where

Bf is an air-converted back focal length of the whole system on the reduction side of the projection zoom lens.

6. The projection zoom lens system according to claim 1, wherein the following conditional expression (5) is satisfied:

$$1.0 < \Delta dG_3/f_w \tag{5}$$

where $\Delta dG_3$ is a moving distance of the third lens group from the wide-angle end of the projection zoom lens to the telephoto end of the projection zoom lens during the power variable operation.

7. A projection type display apparatus comprising:

a light source;

a light valve;

an illumination optical unit guiding rays originating from the light source into the light valve; and a projection zoom lens system according to claim 1, wherein the rays originated from the light source are optically modulated by the light valve, and are projected on a screen by the projection zoom lens system.

* * * * *